June 17, 1969
W. ULLMANN ET AL
3,450,456
MEANS FOR POSITIONING WORKPIECE AND TOOL WITH DOUBLE-IMAGE MICROSCOPE
Filed July 12, 1965
Sheet 1 of 4
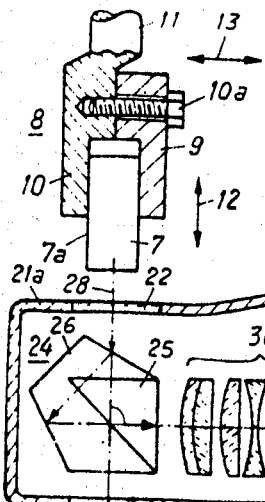
Fig. 1
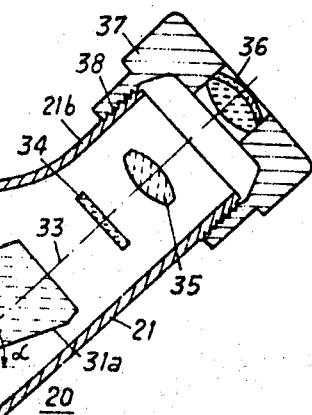
Fig. 2
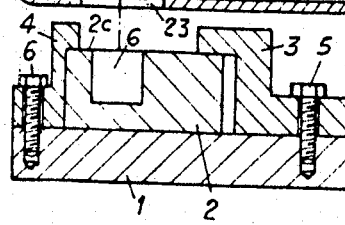
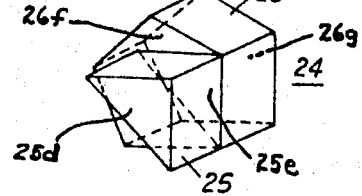
Fig. 3
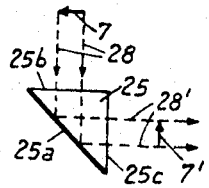
Fig. 5
Fig. 4
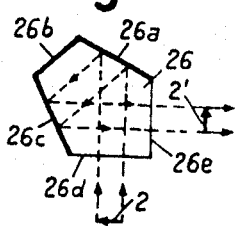
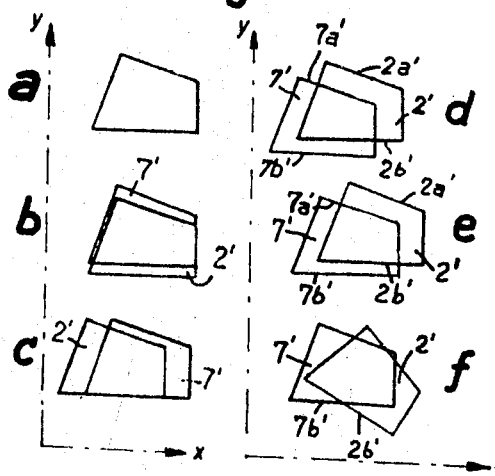
INVENTORS:
WERNER ULLMANN &
BY FERDY HERMANN
Werner W. Kleeman
Attorney

INVENTORS:
WERNER ULLMANN
& FERDY HERMANN

# United States Patent Office 3,450,456
Patented June 17, 1969

3,450,456
MEANS FOR POSITIONING WORKPIECE AND TOOL WITH DOUBLE-IMAGE MICROSCOPE
Werner Ullmann, Muralto, Locarno, and Ferdy Hermann, Lucerne, Switzerland, assignors to A.G. für industrielle Elektronik Agie, Losone, near Locarno, Switzerland, a corporation of Switzerland
Continuation-in-part of application Ser. No. 71,238, Nov. 23, 1960. This application July 12, 1965, Ser. No. 471,321
Claims priority, application Switzerland, Nov. 24, 1959, 80,991, Patent 384,243
Int. Cl. G02b 21/18, 7/04
U.S. Cl. 350—31
15 Claims

ABSTRACT OF THE DISCLOSURE

A device for determining the relative position of two members by a double reflecting prism comprising a first prism producing an even number of reflections and a second prism producing an odd number of reflections.

---

This application is a continuation-in-part of our copending United States application, Ser. No. 71,238, filed Nov. 23, 1960, now abandoned, and entitled, "Method and Means for Positioning Workpiece and Tool With Double-Image Microscope."

The present invention relates to a novel means for determining the relative position between a workpiece and a tool and, more particularly, to a double-image microscope designed to facilitate adjustment of the relative position of a workpiece and a tool readily adapted for use in electroerosion operating machine tools.

In a great many machining operations carried out by means of sundry machine tools, it is absolutely necessary that the tool, by way of example, a punching tool, assumes and accurately maintains a predetermined position relative to the workpiece throughout a given work cycle. If the tool member is caused to approach the workpiece until contact therewith, it can often not be determined with the required accuracy whether the tool is located and holding the predetermined position.

In electroerosion operating machine tools, recesses are formed by moving an electrode, the shape of which corresponds to the negative or converse of the recess or configuration to be produced, into the surface of a workpiece after having applied a suitable voltage. In the case of more complex configurations or when high demands are made on the quality and tolerances with which the work surface is to be produced, it is necessary to produce a recess with several electrode tools employed in succession. Consequently, all successively used electrodes must maintain a predetermined position with respect to the workpiece and the electrode tool previously employed. However, when an electrode tool is replaced by a subsequent electrode inserted in the same electrode holder, displacement of said subsequent electrode is unavoidable so that the new electrode must again be adjusted into its proper position with respect to the workpiece and the recess or desired configuration formed therein.

There are known in the art centering microscopes which may be clamped into machine tools in the position of a previously arranged tool member. The use of such centering microscopes enables the surface of the workpiece which is to be accurately machined to be inspected, allowing for adjustment of a predetermined relative position of tool holder and workpiece. However, such microscopes do not generally provide the required accuracy since lateral displacements are unavoidable when the microscope is replaced by the tool. Furthermore, microscopes have been known in the art wherein the images of two adjacent objects can be brought into coincidence so that the boundary lines thereof merge and are simultaneously viewed. Here again, such optical systems do not permit accurate adjustment of the relative position of a tool member and associated workpiece since the lateral viewing operation prevents detection of the deviations in the direction of the path of rays. Systems of the last mentioned type are thus not utilizable for the purposes of the present invention.

The present invention obviates the aforementioned disadvantages by the provision of a double-image microscope which provides for an accurate adjustment of the relative position between a workpiece and a tool member, and is readily suitable for use in conjunction with electroerosion operating machine tools. The double-image microscope designed pursuant to the teachings of the present invention is constituted by a system of mirrors or prisms which are adapted to be inserted between the workpiece and a tool member for the purpose of receiving rays and of bringing to coincidence the noninverted light rays emerging from the tool member and the workpiece. The rays are located in a common directon at an angle at least substantially normal to a straight connecting line between the objects in an optical magnifying system known per se and having an objective and an eyepiece. The magnifying system is further provided with an inverting prism for obtaining the non-inverted representation of the images of the two objects, i.e. workpiece and tool member.

Accordingly, it is an important object of the prevent invention to provide a double-image microscope by means of which the relative position of a workpiece and tool member can be accurately adjusted.

It is another important object of the present invention to provide microscope for, permitting accurate adjustment of the desired relative position between a workpiece and a tool member so that once this desired position is determined it will remain fixed even upon removal of the microscope.

Still a further object of the present invention is to provide a double-image microscope of the type described wherein lens aberrations of the magnifying system will not adversely influence the reproduced relative positions of the workpiece and the tool member.

A further object of the present invention is to provide a double-image microscope by means of which deviations in at least two directions can be simultaneously corrected.

Another object of the present invention is to provide a microscope of the type described, wherein true images of the workpiece and tool member and the position of the boundary surfaces thereof are represented so that the represented image renders it readily possible to determine in which direction the coordinate spindles of the work table and of the electrode system, respectively, must be actuated in order to obtain proper relative positioning of tool member and workpiece.

Yet a further object of the present invention is to provide a double-image microscope wherein it is readily possible to determine, by viewing of the reproduced images, which image represents the workpiece and which the tool member.

These and still further objects of the present invention and the entire scope of applicability thereof will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 is a longitudinal sectional view of a first embodiment of double-image microscope designed according to the present invention for partial image reproduction and employed in conjunction with a workpiece and a tool electrode of an electroerosion operating machine tool;

FIGURE 2 is a perspective view of a system of superimposed prism members employed in the microscope shown in FIGURE 1 and positionable between the electrode tool and the workpiece;

FIGURE 3 is a longitudinal section of the 90-degree or triangular prism member of the superimposed prisms depicted in FIGURE 2;

FIGURE 4 is a sectional view of the pentagonal prism of the superimposed prisms shown in FIGURE 2;

Figure 6:
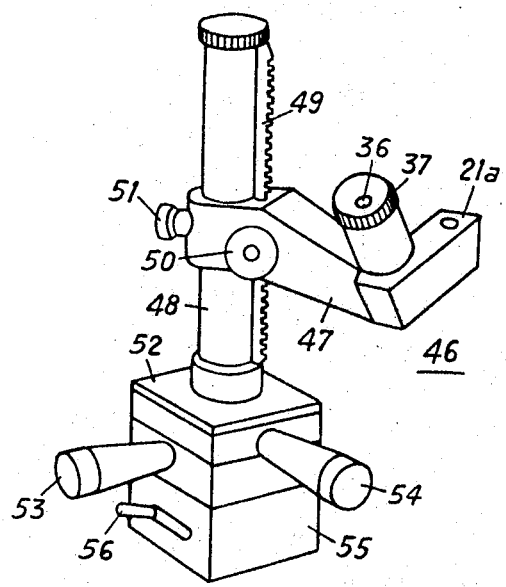
Figure 7:
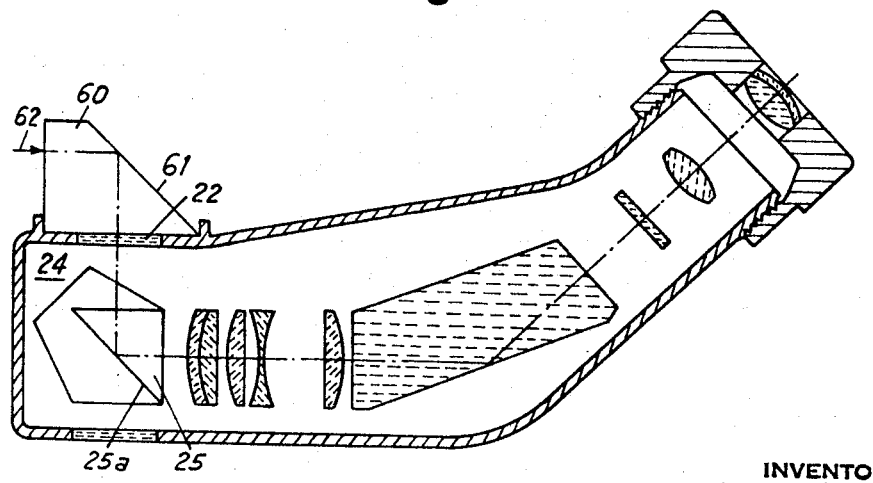
Figure 8:
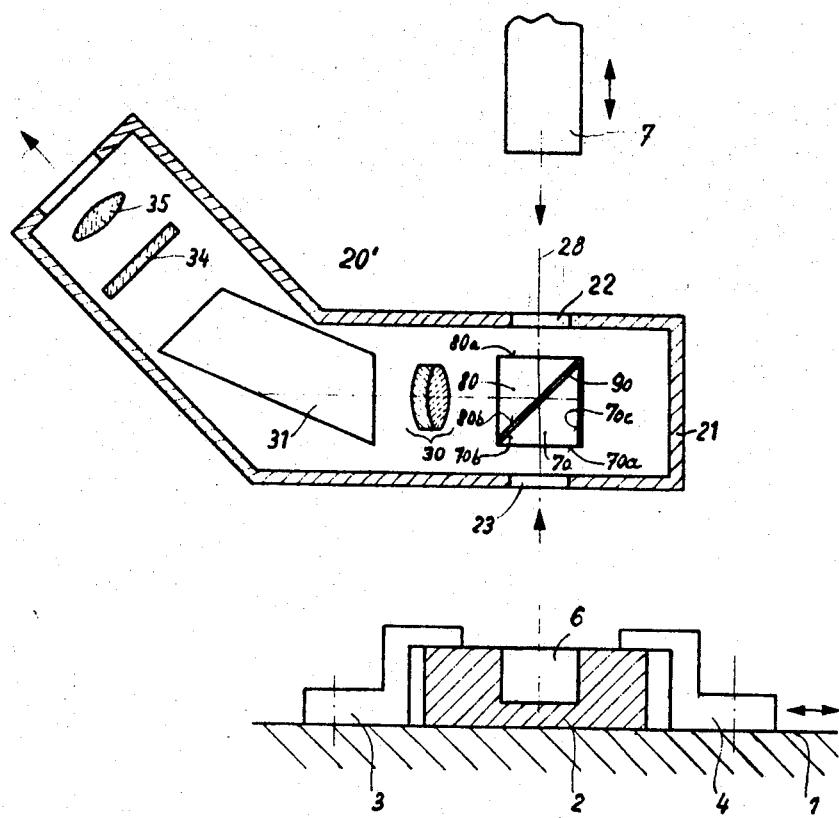

FIGURES 5a through 5f schematically illustrate respective portions of the images seen through the microscope of FIGURE 1 with different relative position of the electrode tool and the workpiece;

FIGURE 6 is a perspective view of a double-image microscope provided with a base;

FIGURE 7 is a longitudinal sectional view of a double-image microscope, similar to that shown in FIGURE 1, and further provided with an attachable prism for determining correct vertical movement of a tool member;

FIGURE 8 is a longitudinal sectional view of a further embodiment of inventive double-image microscope using a system of prisms resulting in full-image reproduction; and FIGURES 9a to 9f schematically illustrate the full images seen through the microscope of FIGURE 8 with different relative position of electrode tool and workpiece.

Referring now to the drawings and, more particularly, initially directing attention to the exemplary embodiment of FIGURE 1, there is shown a base plate or work table 1 to which a workpiece 2 is attached by means of the two clamp members 3 and 4. The latter are, in turn, anchored to base plate 1 by bolts 5 and 6'. Base plate 1 may be assumed to be a portion of an electroerosion machine tool. The workpiece 2 is provided with a rough drilled recess 6 which is to be reworked by an electrode tool 7. This electrode tool 7 is fixedly retained in a clamping device 8 comprising a clamping member 9 releasably secured to the body portion 10 of clamping device 8 by means of threaded bolt means 10a. Body portion 10 is connected with a carriage guiding system of the machine through the intermediary of a connecting bar 11. The electrode tool 7 can thus be displaced in vertical direction as represented by the double-headed arrow 12, and further, in the two plane coordinate directions, i.e., in the Y-direction represented by the arrow 13 and in the X-direction normal to the plane of the drawing of FIGURE 1.

In order to carry out further machining of the workpiece 2, the electrode tool 7 must be adjusted by appropriate manipulation of spindles (not shown) or other expedients which move the electrode tool 7 in the X and Y-directions such that said tool will be accurately positioned above the recess or bore 6. In other words, the position of the electrode tool 7 must be such that its projection on the surface 2c of the workpiece 2 will accurately register or align with the recess 6. In order to enable such a setting to be achieved, there is provided a double-image microscope, generally designated by reference numeral 20, which can be inserted between the electrode tool 7 and the workpiece 2. This double-image microscope 20 will permit the tool 7 and workpiece 2 to be simultaneously viewed so that the desired relative position can be easily obtained, as will be more fully described hereinafter.

Double-image microscope 20 consists of a housing 21 including a forward portion 21a and a rearward portion 21b. The forward portion 21a is adapted to be inserted between the workpiece 2 and the electrode tool 7, whereas the rearward portion 21b serves to carry the objective. The two portions 21a and 21b of the housing 21 define an angle α with a horizontal which is about 45°, as shown in the drawing.

The forward housing portion 21a inserted between the electrode tool 7 and the workpiece 2 is provided with an upper and lower aperture adapted to be covered by a transparent plate to define windows 22 and 23, respectively. These two windows 22 and 23 may be colored, for example, red and green, so that the images shown by the microscope 20 clearly indicate which portion of the represented images originates from the electrode 7 and which portion from the workpiece 2. Arranged in the housing 21 intermediate the two windows 22 and 23 is a system of prisms and, in particular, a double or superimposed prism member 24. The double prism 24 is shown in greater detail in the perspective view of FIGURE 2 and consists of a triangular or 90° prism 25 and a pentagonal prism 26. The base surface or face 25a forming the hypotenuse of the right triangle prism 25 is provided with an opaque coating, such as a black coat of varnish, so that light can only enter or emerge from the prism 24 through the faces or legs 25b, 25c enclosing the right angle, as best seen in FIGURE 3. As clearly seen from FIGURES 1 and 3, the light emanating from the electrode 7 is reflected an odd number of times, e.g., once by the base surface 25a of the prism 25 so that the image 7' will be produced behind said prism. It may be seen that the light rays emerging from the electrode 7 are located in the direction of the connecting line 28 extending between the electrode 7 and the workpiece 2 while the light rays 28' reflected by the prism 25 enclose a right angle with this line 28. It will further be appreciated that the angularly disposed peripheral faces 25a, 25b, 25c of the triangular prism 25 are bounded by a pair of planar side surfaces 25d, 25e.

In the pentagonal prism 26, all of the outer angularly disposed peripheral surfaces or faces 26a, 26b and 26c which do not enclose a right angle are coated so that light can only enter and emerge through the two peripheral faces or surfaces 26d and 26e enclosing a right angle. As clearly shown in FIGURE 4, the light rays from the workpiece 2 which are also located in the direction of the connecting line 28 between the electrode 7 and the workpiece 2 are twice reflected, i.e., an even number of times, in the pentagonal prism 26, specifically by the surfaces 26a and 26c so that an image 2' is obtained which is similarly oriented as image 7'. Each of the images 2' and 7' represent a portion of opposite surfaces of the workpiece 2 and electrode 7, respectively. Here again, the angularly disposed peripheral faces 26a to 26e are bounded by a pair of plannar side surfaces 26f and 26g, with the side surfaces 25e and 26f of prisms 25 and 26, respectively, contacting one another along a plane of joinder which, in this embodiment, is in substantial coincidence with the axis along which extend light rays emanating from between opposed faces of the electrode 7 and workpiece 2.

The rays emerging from the prism surfaces 25c and 26e then enter the objective system of lenses 30. This system of lenses comprises, by way of example, five individual lens members and corresponds to the objective of a common microscope. The objective 30 is preferably corrected chromatically and with respect to geometric criteria. Light rays emerging from the objective 30 will then enter an inverting prism 31 having an edge portion 31a designed to invert the image about its horizontal and vertical axes in order to compensate for the inversion produced by the system of objective lenses 30. Inverting prisms suitable for the purposes of the invention are generally known to the art so that a detailed description may be dispensed with. Suffice to say, the collective image of workpiece and tool finally produced by the double-image microscope is noninverted.

The images 2' and 7' must appear erect to the observer, that is to say, the rear edge 7a of the electrode 7, by way of example, must be located for the observer at the upper edge of the image field, that is, in accordance with the orientation of the images 2' and 7' shown in FIGURES 3 and 4. The magnifying system corresponding to a microscope and comprising the system of lenses 30, 35 and 36, however, results in inversion of the image reproduced. Unless the inverting prism 31 is provided the rear edge 7a of the electrode will appear at the lower edge of the image field. The inverting prism 31, however, causes the image to be inverted so that the images appear erect and noninverted, as shown at 2' and 7' in FIGURES 3 and 4.

The light rays 33 emerging from the inverting prism 31 first pass into a graduated plate 34 provided with suitable graduations and subsequently into an ocular or eyepiece comprising a lens 35 and a double lens 36. For the purpose of accommodation, the double lens 36 is mounted in a rotatable sleeve 37 which is connected with the rearward housing portion 21b by means of an adjusting thread portion 38. The distance between the lens 35 and the double lens 36 can accordingly be varied for focusing.

In conjunction with FIGURES 5a through 5f there will now be considered what images are visible through the microscope 20 in dependence upon the various relative positions of the electrode tool 7 and the workpiece 2. It is to be assumed that the recess 6 and the electrode tool 7 are of quadrilateral cross-section, as best seen in FIGURE 5a. In FIGURE 5a, the electrode tool 7 and the workpiece 2 have been corrected to assume the predetermined relative positions, the left-half image of the visible quadrilateral area originating from the electrode 7 and being designated at 7' while the right-hand half originates from the workpiece 2 and is designated by reference numeral 2'. If the window 22 is red and the window 23 green, the left-hand half of the image, i.e., the image 7' of the electrode 7 appears red, and the right-hand half, i.e., the image 2' of the workpiece 2 green.

FIGURE 5b shows the collective image of electrode and tool reproduced by the microscope 20 if the position is correct in the X-direction while there is an error in the Y-direction. In this case, the electrode 7 must be moved towards the microscope 20 so that the upper and lower boundary lines will merge and produce the image shown in FIGURE 5a. In the showing of FIGURE 5c the position is correct in respect of the Y-axis while correction is necessary along the X-axis. In order to effect such correction, the electrode 7 must be moved to the left or the workpiece 2 to the right. FIGURES 5d and 5e show images in which correction is necessary in both the X and Y-directions. If such an image appears, correction is preferably first made in the Y-direction so that the two base lines 7b' and 2b' will coincide and merge into a common straight line. Subsequently, correction is made in the X-direction until the two upper boundary lines 7a' and 2a' coincide and merge into a common straight line.

It is also possible that an error occurs wherein the two images are displaced with respect to each other, that is to say, not in parallel realtionship but such as to enclose an angle as shown in FIGURE 5f. In this case, the table is rotated, by way of example, until the boundary edges 2b' and 7b' are parallel whereupon further correction can be effected by appropriately displacing along the coordinates X and Y the electrode tool 7 in a manner previously described.

Mention is to be made of the fact that adjustment will be more accurate the more closely the two images are positioned next to one another. For this reason the two prisms 25 and 26 are approached or positioned as closely as possible although an opaque coat is required between them. This coat must then be kept as thin as possible.

In FIGURE 6 there is shown a double-image microscope in perspective view. The optical portion, the details of which may be seen by referring to FIGURE 1, is generally indicated by reference numeral 46. Optical portion 46 is supported by a movable arm 47 which, in turn, can be displaced in a vertical direction by means of a vertical guide or standard 48. The guide 48 includes a rack portion 49 with which a gear (not shown) engages, said gear can be rotated by means of an adjusting knob 50. Rotation of the adjusting knob 50 brings about vertical movement of the movable arm 47 and also the optical system 46. Provided on the movable arm 47 is a locking pin 51 adapted to lock the arm 47 at a predetermined location. The lower end of the guide member 48 is attached to a plate 52 which can be adjusted in the X-direction and in the Y-direction by means of a slide system of conventional construction and known per se. The spindles 53 and 54 are provided to adjust the slide system. The base-plate 55 is designed to be placed on a flat surface or plate of the machine, e.g., a spark-erosion machine. Attachment may, by way of example, be affected by an internally positioned magnet (not shown) which may be raised or lowered by means of lever 56.

In use, the microscope is first fixed onto a flat surface of the machine in such a manner that the forward housing portion 21a is located between the workpiece 2 and the electrode 7. By means of the adjusting knob 50 the height of the optical system 46 is so adjusted that the workpiece 2 appears clearly defined. If necessary, the position of the microscope may be adjusted by means of the spindles 53 and 54. The height of the electrode 7 is then varied until the underface of the electrode is well defined. If the electrode 7 and the workpiece 2 clearly appear in the field of vision, the position of the electrode 7 or of the workpiece 2 may be corrected as discussed in conjunction with FIGURES 5a to 5f until the boundary lines thereof accurately merge into one another in the manner shown in FIGURE 5a. Upon completion of the positional correction, the microscope is removed and the electrode 7 inserted in the recess 6 of the workpiece 2 for carrying out the machining operation, only a vertical displacement of the electrode to approach the workpiece 2 is necessary.

It can be seen that the positional correction of the electrode 7 and the workpiece 2 is performed independently of the position of the microscope since both images, i.e., the images 7' and 2' of the electrode and of the workpiece, respectively, appear simultaneously. Upon completion of the adjustment the microscope may be removed and the settings remain unchanged. Optical distortions, if any, of the system of lenses exert no adverse effects since the images of both objects are simultaneously subjected to such distortion so that relative errors cannot arise. By virtue of the color of the windows 22 and 23 it can readily be determined which image portion depicts the workpiece 2 and which the electrode tool 7.

FIGURE 7 depicts a double-image centering microscope in a view similar to that shown in FIGURE 1. Placed upon the upper window 22 in the housing portion 21a is a prism 60 with a reflecting surface 61 inclined at an angle of 45°. The reflecting surface 25a of the right angle prism 25 in the system of prisms 24 is parallel with the reflecting surface 61 of the prism 60 so that a light ray 62 reaching the prism 60 and the ray emerging from the system of prisms 24 will also be parallel. The microscope disclosed may now be used in conjunction with the attachable prism 60 in order to check whether the electrode 7 moves accurately when moved in the vertical direction. By way of example, it is possible to determine whether an electrode 7 is clamped in the clamping device 8 (FIGURE 1) so as to be accurately positioned in a true vertical. Such a check is necessary since the setting of the electrode 7 described in conjunction with FIGURE 5 would otherwise change during the downward movement.

Figure 9:
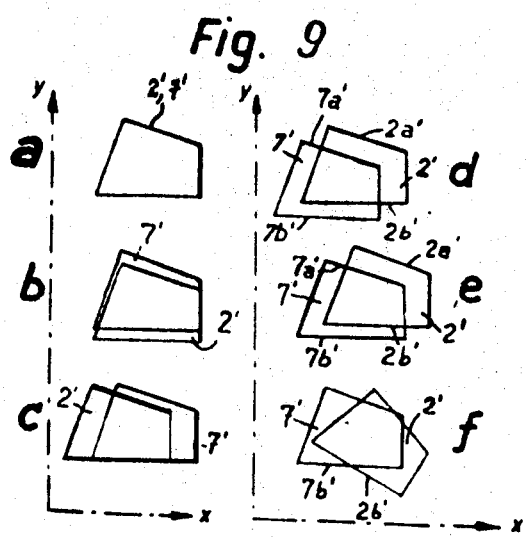

Finally, FIGURES 8 and 9 illustrate a further embodiment of inventive centering or double-image microscope depicting details of the physical structure of both ray deflecting systems wherein full image reproduction is obtained. Due to the fact that there is a certain basic similarity between this embodiment and the embodiments of FIGURES 1 to 7 the same reference characters have been used for the same or analogous elements. By referring to FIGURE 8 it will be seen that the illustrated centering or double-image microscope 20' embodies a housing 21 having two superimposed and aligned windows 22 and 23. The bundle of rays entering the housing 21 from beneath and through the lower window 23 arrive vertically at the frontal peripheral surface or face 70a of a prism 70 which is of triangular cross-section. The inclined peripheral or boundary surface 70b is provided with a semi-permeable layer 90. The bundle of rays coming through the window 23 are partially reflected at this layer 90 at right angles in the direction of the reflector surface 70c. There they are fully reflected onto the partially or semipermeable layer 90, at which a portion of the bundle of rays arrives at the objective 30, the inverting prism 31, graduated plate 34 and then at the ocular 35.

The bundle of rays entering the housing 21 by means of the window 22 likewise arrives vertically at a peripheral face or surface 80a of a further prism 80 which is also triangular-shaped in cross-section. The inclined peripheral or boundary surface 80b of this prism 80 bears against the mirrored or semireflective inclined surface 90. At this location the bundle of rays are likewise partially reflected, arriving towards the left at right angles to the original direction, at the ocular 35 via the objective 30, inverting prism 31, and graduated plate 34. In this exemplary arrangement the prisms 70 and 80 contact one another along a plane of joinder disposed transverse to the axis 28 along which extend the light rays emanating from between opposed faces of electrode tool 7 and workpiece 2. Also, like the triangular prism 25 of FIGURE 1, each of the prisms 70 and 80 also includes a respective pair of parallel planar side surfaces or faces.

It will thus be appreciated that the bundle of rays entering through the window 22 are reflected once, i.e., an odd number of times, and the bundle of rays entering through the window 23 are reflected twice, i.e., an even number of times. Both bundles of rays are thus combined and rectified behind the semipermeable layer or plate 90 and arrive at a magnifying system composed of objective 30 and the ocular 35. As previously mentioned, between both of these lens systems there is inserted an inverting prism 31 for image inversion and a graduated plate 34. In addition to carrying out inversion of the reproduced images the inverting prism 31 brings about that the path of rays, as depicted, is appropriately inclined so that the eye can be brought without difficulty to the ocular 35.

In FIGURE 8 reference character 7 once again represents electrode tool and reference character 2 the workpiece, the latter of which is secured by means of two clamps 3 and 4 to a base plate or work table 1. The observer receives the images depicted in FIGURE 9. With the embodiment of double-image microscope previously described in conjunction with FIGURE 8, the observer sees the entire images of electrode 7 and workpiece 2. For simplicity, it has been assumed that the electrode 2 and recess 6 of the workpiece 7 possess the same form as in FIGURE 5. Naturally, both electrode 7 and recess 6 could have any conceivable form.

In FIGURE 9a both images 2', 7' are arranged correctly above one another. Thus, electrode 7 and workpiece 2 have the correct desired relative position with regard to one another. In FIGURE 9b the images 2' and 7' of the electrode 7 and the workpiece 2 respectively, are correct in the X-direction but along the Y-axis are displaced with respect to one another. By properly displacing the work table 1 or the electrode 7 along the Y-axis both images 2', 7' are brought into coincidence and corresponding to the showing of FIGURE 9a. In FIGURE 9c, both images 2', 7' have the correct relative position along the Y-axis but an incorrect relative position along the X-axis. Due to appropriate relative displacement of electrode 7 and workpiece 2 along the X-axis there results the desired correct relative position of both images 2', 7' according to FIGURE 9a. FIGURES 9d and 9e depict an incorrect position of both images 2', 7' in both coordinate directions. During correction both images are first displaced along one coordinate and then along the other until there appears coincidence of the images 2', 7' according to FIGURE 9a. FIGURE 9f illustrates deviation of the relative position of both images 2', 7' along both coordinate axes as well as also an angular rotation. In order to achieve the correct relative position according to FIGURE 9a, either the electrode 7 or workpiece 2 are turned relative to one another for such length of time until the boundary lines 2b', 7b' are in parallelism. Thereafter, both of the images 2', 7' are corrected along both coordinate axes by proper displacement of either the workpiece 2 or the electrode 7, or both.

It will be recalled that in FIGURE 7 the microscope according to FIGURE 1 was illustrated with a mounted prism 60. It is also readily possible in the same manner to provide the microscope 20' of FIGURE 8 with such a mountable and detachable prism 60. It is only necessary to replace the prism system 24 of the arrangement of FIGURE 7 by the prisms 70, 80, with the partially or semipermeable layer 90.

It may thus be seen that the various embodiments of microscope hereinabove described meet all the requirements regarding adjustment of the electrode tool for electroerosion machines or other machine tools, such as punching machines. These double-image microscopes are of simple design and the reproduced images of both objects are subjected to the same reproduction errors, so that such errors will not adversely affect the accuracy of the positional adjustment of workpiece and tool.

While there is shown and described present preferred embodiments of the invention it is to be distinctly understood that the invention is not limited thereto but may be otherwise variously embodied and practised within the scope of the following claims.

What is claimed is:

1. In a double-image microscope for facilitating adjustment of the relative positions of two spaced apart confronting members, particularly a workpiece and a tool member in an electroerosion machine tool, the combination comprising:
   a housing having a light-transmitting portion disposed in the space between said members;
   said members having opposed faces between which light rays extend along an axis;
   double prism means including a first prism means and a second prism means disposed in said light-transmitting housing portion for receiving said light rays extending along said axis and for reflecting the same in the same direction at an angle substantially normal to said axis;
   said first prism means being oriented to produce an even number of light ray reflections therein to thereby transmit a resultant first reflected image directed at an angle substantially normal to said axis;
   said second prism means being oriented to produce an odd number of light ray reflections therein to thereby transmit a resultant second reflected image directed at an angle substantially normal to said axis;
   said members being relatively adjustable in position until said first and second images are in proper coincidence with one another.

2. The combination defined in claim 1 wherein said first and second prism means are interconnected with one another along a plane of joinder.

3. The combination defined in claim 2 wherein said plane of joinder is disposed in coincidence with said axis.

4. The combination defined in claim 2 wherein at least one of said prism means is a right triangular prism.

5. The combination defined in claim 2 wherein said first prism means includes a plurality of angularly disposed peripheral faces and a pair of parallel planar side surfaces, said second prism means also including a plurality of angularly disposed peripheral faces and a pair of parallel planar side surfaces, said first and second prism means being interconnected with one another, with one of said first prism means side surfaces being in contact with one of said second prism means side surfaces, said first and second prism means contacting side surfaces defining said plane of joinder, said plane of joinder being disposed in coincidence with said axis.

6. The combination defined in claim 5 wherein said first prism means is a right triangular prism and wherein said second prism means is a pentagonal prism.

7. The combination defined in claim 6 wherein said right triangular prism includes a pair of leg portions defining a right angle, with one of said leg portions having its surface mutually perpendicular to both said axis and said plane of joinder.

8. The combination defined in claim 7 wherein said pentagonal prism includes a pair of leg portions defining a right angle, with one of said leg portions having its surface mutually perpendicular to both said axis and said plane of joinder.

9. The combination defined in claim 2 further including an inverting prism positioned to receive said first and second images for inversion thereof.

10. The combination defined in claim 9 further including an image magnification system juxtaposed to said inverting prism for magnifying said inverted images.

11. The combination defined in claim 10 wherein said magnification system includes a graduated plate.

12. The combination defined in claim 2 further including a detachable right triangular prism means releasably secured to said housing portion between said double prism means and one of said members.

13. A double-image microscope facilitating adjustment of the relative position of a spaced confronting workpiece and tool member in two coordinates, particularly suitable for use in conjunction with electroerosion machine tools; comprising a housing having a forward portion and a rearward portion, said forward portion being disposed in the space between said workpiece and tool member and having a pair of diametrically opposed apertures for optically communicating said workpiece and tool member, respectively, and defining a pair of objects, double prism means comprising a pair of rigidily interconnected prism members disposed in said forward portion of said housing and in alignment with said diametrically opposed apertures for receiving and reflecting light rays in the same direction emanating from opposed faces of said workpiece and said tool member, respectively, and lying in respective planes defined by two coordinates, said double prism means reflecting said light rays at an angle substantially normal to an axis connecting said workpiece and said tool member, said rigidly interconnected prism members comprising a right angle prism and a pentagonal prism, one of which receives a group of said light rays from said workpiece and the other from said tool member, said right angle prism including a pair of leg portions defining a right angle, one of said leg portions of said right angle prism being positioned closest to one of said opposed apertures, said pentagonal prism also including a pair of leg portions defining a right angle, one of said leg portions of said pentagonal prism being positioned closest to the other of said opposed apertures, a magnifying system arranged in said rearward portion of said housing including objective means, an inverting prism and an eyepiece for magnifying said light rays reflected by said double prism to produce a respective noninverted image representing at least a portion of said workpiece and said tool member, said respective images simultaneously indicating the relative positions of said opposed surfaces of said workpiece and said tool member in said two coordinates.

14. A double-image microscope facilitating adjustment of the relative position of a spaced workpiece and tool member confronting one another in two coordinates, particularly suitable for use in conjunction with electroerosion machine tools; comprising a housing having a forward portion and a rearward portion, said forward portion being disposed in the space between said workpiece and tool member and having a pair of diametrically opposed apertures for optically communicating said workpiece and tool member, respectively, and defining a pair of objects, double prism means comprising a pair of rigidly interconnected prism members disposed in said forward portion of said housing and in alignment with said diametrically opposed apertures for receiving and reflecting light rays in the same direction emanating from opposed faces of said workpiece and said tool member, respectively, and lying in respective planes defined by two coordinates, said double prism means reflecting said light rays at an angle substantially normal to an axis connecting said workpiece and said tool member, said rigidly interconnected prism members comprising a right angle prism and a pentagonal prism, one of which receives a group of said light rays from said workpiece and the other from said tool member, a magnifying system arranged in said rearward portion of said housing including objective means, an inverting prism and an eyepiece for magnifying said light rays reflected by said double prism to produce a respective noninverted image representing at least a portion of said workpiece and said tool member, said respective images simultaneously indicating the relative positions of said opposed surfaces of said workpiece and said tool member in said two coordinates, and a colored transparent plate interposed between said double prism and at least one of said pair of objects so as to ascertain which portion of said produced respective non-inverted image represent which of said pair of objects.

15. A double-image microscope facilitating adjustment of the relative position of a spaced workpiece and a confronting tool member in two coordinates, particularly suitable for use in conjunction with electroerosion machine tools; comprising a housing having a forward portion and a rearward portion, said forward portion being disposed in the space between said workpiece and tool member and having a pair of diametrically opposed apertures for optically communicating said workpiece and tool member, respectively, and defining a pair of objects, double prism means comprising a pair of rigidly interconnected prism members disposed in said forward portion of said housing and in alignment with said diametrically opposed apertures for receiving and reflecting light rays in the same direction which emanate from opposed faces of said workpiece and said tool member, respectively, and lying in respective planes defined by two coordinates, said double prism means reflecting said light rays at an angle substantially normal to an axis connecting said workpiece and said tool member, said rigidly interconnected prism members comprising a right angle prism and a pentagonal prism, one of which receives a group of said light rays from said workpiece and the other from said tool member, a magnifying system arranged in said rearward portion of said housing including objective means, an inverting prism and an eyepiece for magnifying said light rays reflected by said double prism to produce a respective noninverted image representing at least a portion of said workpiece and said tool member, said respective images simultaneously indicating the relative positions of said opposed surfaces of said workpiece and said tool member in said two coordinates, and a detachable right angle prism means releasably fixed to said housing at said forward portion to determine correct vertical displacement of said tool member.

References Cited

UNITED STATES PATENTS

| | | | |
|---|---|---|---|
| 327,320 | 9/1885 | Saegmuller | 88—38 |
| 2,352,644 | 7/1944 | Linderman, et al. | |
| 2,247,113 | 12/1939 | Benford. | |
| 2,427,256 | 9/1947 | Butscher. | |
| 2,452,373 | 10/1948 | Harley | 88—2.6 X |
| 2,492,798 | 12/1949 | Harley. | |
| 2,747,284 | 5/1956 | Christoph. | |
| 3,156,825 | 11/1964 | Lines. | |
| 3,202,052 | 8/1965 | Rambauske et al. | |

FOREIGN PATENTS 384,243  11/1964  Switzerland.

DAVID SCHONBERG, *Primary Examiner.*

P. R. GILLIAM, *Assistant Examiner.*

U.S. Cl. X.R.

350—286